Figure 1:
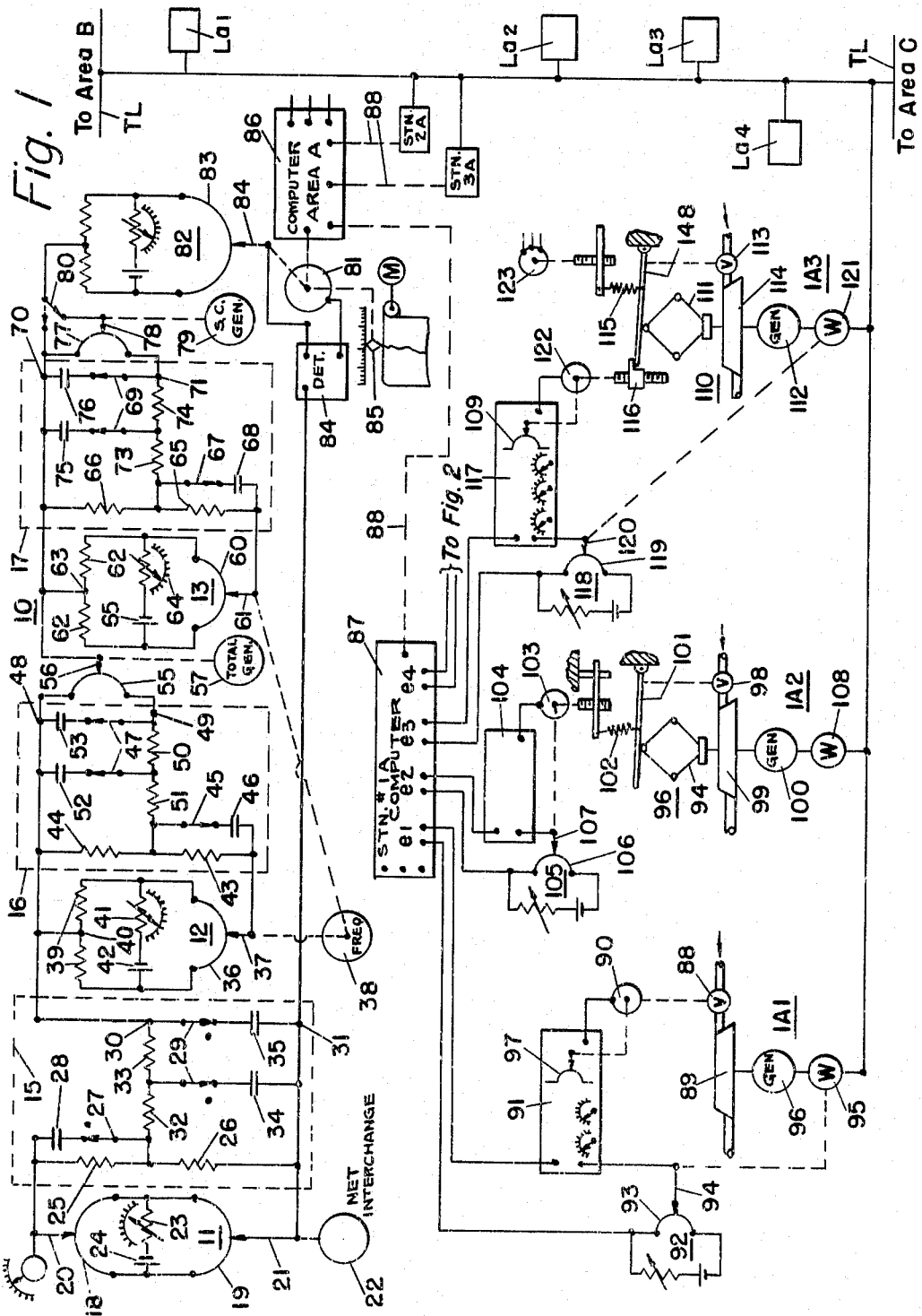

June 22, 1965

E. S. BRISTOL 3,191,051

LOAD FREQUENCY CONTROL SYSTEM

Filed April 18, 1961

2 Sheets-Sheet 1

3,191,051
LOAD FREQUENCY CONTROL SYSTEM
Edward S. Bristol, Philadelphia, Pa., assignor to Leeds and Northrup Company, Philadelphia, Pa., a corporation of Pennsylvania
Filed Apr. 18, 1961, Ser. No. 118,479
10 Claims. (Cl. 307—57)

This invention relates to control of the generation of electrical power by the areas, stations and units of a distribution network and has for an object the provision of control elements which predetermine the extent to which individual stations and units of an area change their generation to meet the area-requirement existing during deviations from the tie-line load/frequency schedule of that area, and which in so doing take into account various time factors, such as the lag between changes in tie-line load of the area and the related changes in frequency, the lags between changes in input to prime movers and the related changes in output of their associated generators, the time difference between generation having a component related to generator speed and generation having no such speed-responsive component and incidental measurement lags. It is to be understood that an area as above set forth may include but a single generating station and retain the advantages of the invention.

In accordance with the present invention, the area-requirement signal has at least two components—one related to frequency-deviation alone or to both frequency-deviation and total area-generation, and the other to tie-line load deviation—in which the relative magnitudes and phase relations of the components may be preset to predetermine the extent to which the generation of the area is changed upon occurrence and during existence of changes in tie-line power flow either to obtain minimum change of generation in the area in response to load disturbances outside of the area or to obtain changes of generation that to predetermined extent aid in damping of tie-line power swings. When the area generation is in part supplied by generators controlled by speed-responsive governors, it is provided that the area-requirement signal shall have a third component—related both to frequency-deviation and speed-controlled generation—whose magnitude and phase relations may also be preset.

Further in accordance with the present invention, the unit demand signals derived from the area-requirement signal may be applied to change the setting of the throttle valve of a unit either directly or through a speed-governing mechanism. In the latter case, the control may be applied to effect minimum change of the governor setting in response to disturbances outside of the area. Alternatively, the unit demand signals may be applied to change the boiler input of the associated unit, in which case the throttle may be controlled by the unit demand signal in response to transient demand changes and boiler input changed only for sustained demand changes.

The invention further resides in systems having the features of combination and arrangement hereinafter described and claimed.

Figure 2:
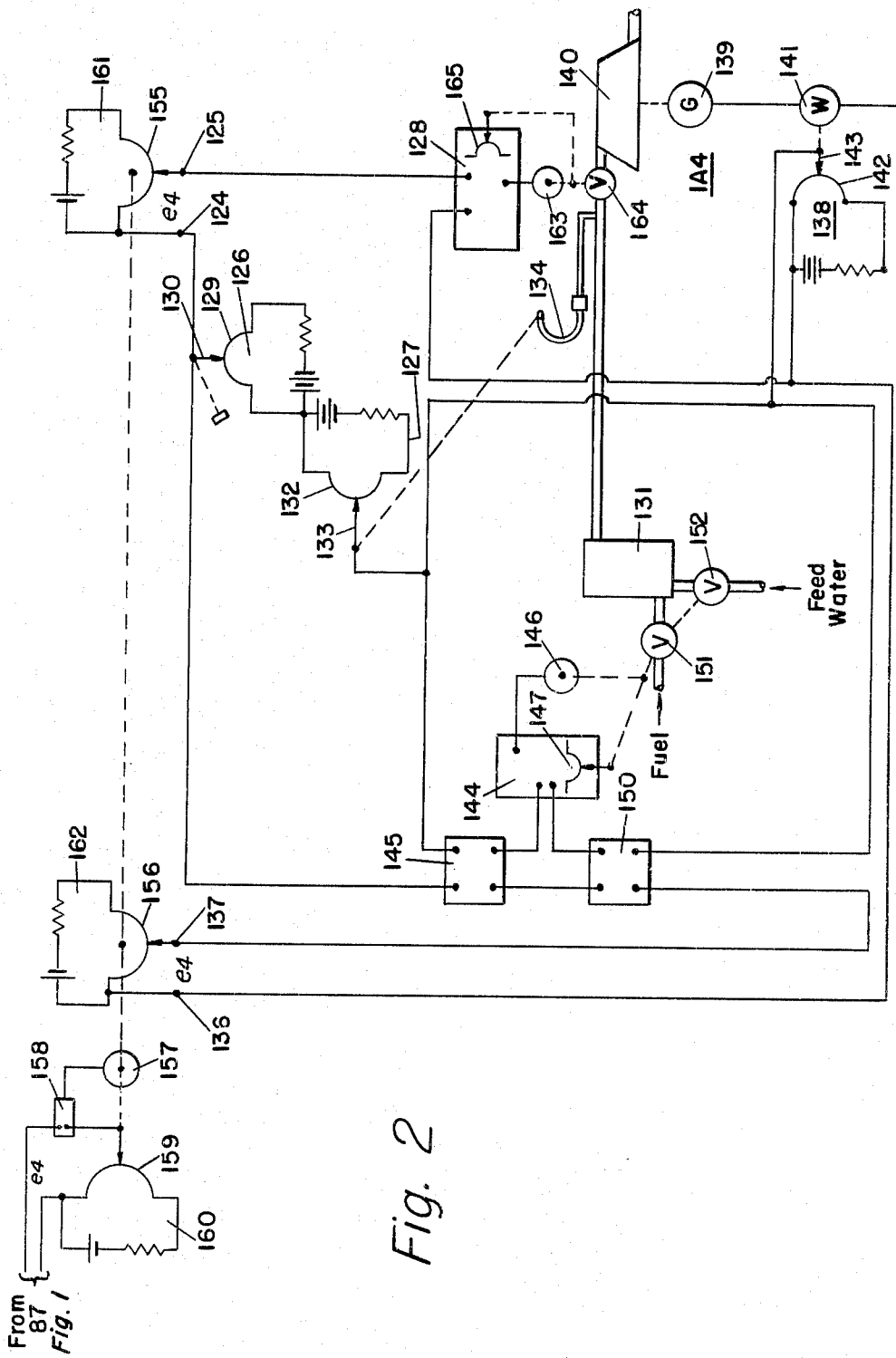

For a more detailed understanding of the invention, reference is made in the accompanying description of one embodiment thereof to the accompanying drawings, in which:

FIG. 1 schematically illustrates a distribution network provided with means in an area to produce an area-requirement signal distributed to stations and units of the area; and FIG. 2 schematically illustrates a system for supplying the unit control signal to one of the units of an area of FIG. 1.

In the relatively simple distribution system shown in FIG. 1, the generating area A comprising stations 1A, 2A and 3A supplies power to its local loads exemplified by blocks $L_{a1}$–$L_{a4}$ and is connected by one or more tie-lines TL to another or other generating areas. In addition to meeting its local load demands, each area is obligated to supply power to, or receive power from, the distribution system in accordance with a fixed or variable tie-line power/frequency schedule. When the net power interchange over its tie-line or tie-lines departs from schedule, an area is required to change its generation to bring it back on schedule. Such change in generation demand is herein termed the "area requirement."

Assuming that the generation in area A normally has no significant component independently related to generator speed, the generation in area A will not be changed upon occurrence in area B and/or C of load changes effecting a change in frequency provided that the area-requirement signal for area A has components adapted so to correlate factors including the change in frequency, a gain coefficient representing a load/frequency characteristic of area A, the deviation in power interchange and the total generation of area A.

So far as steady-state conditions are concerned, the area-requirement signal may be (1) $\qquad Q_A = -\Delta T_A - K_1 G_A \Delta f$ wherein $Q_A$=area-requirement for area A
$\Delta T_A$=net deviation from scheduled power interchange of area A, with power flow away from the area taken as positive
$G_A$=total active generation of area A
$\Delta f$=deviation from standard frequency
$K_1$=gain coefficient For a change $\Delta f$ in frequency due to a load change outside of area A:

$$\Delta T_A = -K_1 G_A \Delta f$$

and $$Q_A = 0$$

Thus for remote load changes affecting frequency, the area-requirement signal for area A remains at zero value and so calls for no change of generation in area A. In brief, under steady-state conditions and with multipliers $K_1$ and $G_A$ of proper value, the tie-line deviations caused by load or generation changes outside of area A do not give rise to an area-requirement signal for area A because the $\Delta T_A$ and $\Delta f$ terms are then of opposite sign and equal.

However, neither of Equations 1 or 2 adequately represents transient relations existing on occurrence of remote load or generation changes or oscillations of tie-line power. Under such conditions, the changes in tie-line load and frequency and in signals representative thereof are displaced in time. Unbalance between energy demand and supply is temporarily met by a continuing transfer of energy to or from rotational inertia of the system supplemented by change of energy supply to speed-responsive generators in remote areas until the system again attains balance at a new frequency.

In order that the area-requirement signal of Equation 1 may also take such transient conditions into account, the frequency term or the tie-line load term, or both, should be time dependent to obtain a desired phase relation between the signal components represented by these terms. So modified, Equation 1 may be rewritten in any of the forms 3A–3C below:

(3A) $\qquad Q_A = -F(t).\Delta T_A - K_1 G_A \Delta f$
(3B) $\qquad Q_A = -\Delta T_A - F_1(t).K_1 G_A \Delta f$
(3C) $\qquad Q_A = -F(t).\Delta T_A - F_1(t).K_1 G_A \Delta f$ In Equations 3A, 3C, the time dependent term $F(t)$ varies in complexity, but for explanation may be represented as a simple phase delay or integrating function expressed as (4) $$F(t) = K_2\left(1 - e^{\frac{-t}{T_c}}\right)$$

wherein $K_2$ = gain coefficient
$e$ = natural log base
$t$ = time
$T_c$ = time constant In Equations 3B, 3C, the time function $F_1(t)$ may be in the nature of a simple proportional plus phase advance or differentiating function and in a typical instance may be expressed as:

(5) $$F_1(t) = 1 + K_3 e^{\frac{-t}{T_{c1}}}$$

wherein $K_3$ = gain coefficient
$t$ = time
$T_{c1}$ = time constant

With the time functions chosen to obtain exact phase and magnitude matching of the signal components representing changes in system frequency and changes in tie-line load, the area-requirement signal for area A will remain at zero under both transient and steady-state conditions when the deviations of frequency and tie-line load are due to load changes outside of area A. Alternatively, phase and magnitude relations can be adjusted to achieve other objectives such as damping of tie-line power swings. In both cases, the area-requirement signal takes into account the transient contribution of the area to the tie-line interchange of power which is related to the inertia characteristic of the rotating masses of the load and generating equipment of the area.

All of the foregoing is on the assumption, above stated, that all of the active generation in area A has no significant component subjected only to speed-governor control. When such is not the case, the area-requirement signal for area A should include an additional component taking into account the gain of the speed governors, the generation subject to speed governor action, and the lag between change of prime mover input and change in output of the generating units so controlled. Such additional component may be expressed as:

(6) $$K_g G_{Ag} . F_2(t) . \Delta f$$

wherein $K_g$ = proportional gain of speed governors or other required gain coefficient
$G_{Ag}$ = active generation subject to speed-governor control
$F_2(t)$ = time function correlating changes in energy input and electrical output Although $F_2(t)$ may be complex in nature in a typical practical case, it may take the form $$\left(1 - e^{\frac{-t}{T_g}}\right)$$

wherein $T_g$ = the representative generation-response time-constant

Such additional component term may be included in any of the area-requirement Equations 1, 3A to 3C. For example, Equation 3C now becomes:

(3D) $$Q_A = -F(t) . \Delta T_A - [K_1 G_A F_1(t) + K_g G_{Ag} F_2(t)] \Delta f$$

Where generation control is applied through adjustment of conventional speed governors, compensation for the corresponding generation response can be incorporated in equation component (6) above. With such additional component term included in any of the aforesaid area-requirement signals, there is taken into account the transient contribution of the area to the tie-line interchange of power which is related to the response characteristics of the generating units which are equipped with speed-responsive governors of the flyball or other type.

An arrangement suited for producing any of the area-requirement signals above mentioned is shown in FIG. 1. The composite signal network 10 comprises three component networks 11, 12, 13 which in association with the related time function networks 15, 16, 17 produce electrical signals respectively related to net deviations of the tie-line power interchange, to the relationship between frequency-deviation and total area-generation, and to the relationship between frequency-deviation and that part of the area-generation which is subject to conventional speed-governor control. The algebraic sum of these signals, as combined in major network 10 with selected predetermined magnitude and phase relationships, constitutes the area-requirement signal utilized for control of the generation of the area in keeping its tie-line schedule.

More particularly, the network 11 is a Wheatstone bridge including a pair of slidewires 18, 19 having relatively movable contacts 20, 21. Slidewire 18 is preset relative to its contact 20 to correspond with the scheduled tie-line power interchange of area A. The slidewire 19 or its contact 21 is coupled to totalizing wattmeter 22 which monitors the net interchange of tie-line power between area A and the rest of the distribution network. Thus, the output voltage of network 11 as appearing between contacts 20 and 21 is of magnitude proportional to the existing deviation ($\Delta T_A$) of tie-line power from the existing schedule and is of polarity dependent upon the sense of such deviation. When the existing deviation is zero, the bridge 11 is in balance, and its output voltage is zero.

The relationship between the concurrent values of the deviation of tie-line power and the output voltage of network 11 may be set or adjusted by the gain control resistance 23 in series with the supply source 24 of network 11 or may be set or adjusted by the gearing or linkage between wattmeter 22 and slidewire 19.

The time function multiplier $F(t)$ for the tie-line power deviation component of the area-requirement signal is determined by the parameters of network 15. The resistors 25, 26 connected in series between the output terminals 20, 21 of network 11 form a potential divider. With the switch 27 open, the voltage drop across resistor 26 is a constant fraction of the total output voltage of network 11. With the switch 27 closed, the capacitor 28 is connected in shunt with resistor 25 and in series with resistor 26 to superimpose a differentiating action upon the aforesaid potential divider action of resistors 25, 26.

With switches 29 of network 15 open, the voltage between the output terminals 30, 31 of network 15 is essentially the same as that across resistor 26. With one or both of the switches 29 closed, one stage or the other, or both, of the two-stage integrating network comprising resistors 32, 33 and capacitors 34, 35 is interposed between resistor 26 and the output terminals 30, 31 so that under transient conditions the changes in voltage between terminals 30, 31 lag to preselected extent the corresponding changes in voltage across resistor 26.

Thus, by selection of the active circuit parameters of network 15, and of the effective gain of the wattmeter-bridge combination 22, 11, there may be predetermined the magnitude and phase of the voltage representing $F(t).\Delta T_A$ and appearing at terminals 30, 31 as a result of changes in tie-line power flow.

The network 12 is a Wheatstone bridge including a slidewire 36 whose position relative to its contact 37 corresponds with the existing frequency as monitored, for example, by the frequency meter 38. The resistors 39, 39 of bridge 12 are so selected or adjusted that at normal frequency, usually 60 cycles, the bridge 12 is in balance and its output voltage as appearing between contact 37 and terminal 40 is zero. When the metered frequency is other than normal, the bridge 12 is unbalanced and its output voltage is of polarity and magnitude corresponding with the sense and extent of the frequency deviation. The gain $K_1$, i.e., the relationship between the concurrent values of the frequency deviation and the output voltage of network 12, may be set or adjusted by the resistance 41 in series with the supply source 42 or by the gearing or other operating linkage between the frequency meter 38 and slidewire 36.

The time function $F_1(t)$ for the frequency deviation component of the area-requirement signal is determined by the active parameters of network 16 which in composition may be similar to network 15. The resistors 43, 44 connected in series across the output terminals 37, 40 of network 12 form a potential divider. With the switch 45 open, the voltage drop across resistor 44 is a constant fraction of the existing output voltage of network 12. With switch 45 closed, the capacitor 46 is connected in shunt to resistor 43 and in series with resistor 44 so to superimpose a differentiating action upon the potential divider action of resistors 43, 44.

With switches 47 open, the voltage between output terminals 48, 49 of network 16 is essentially the same as that across resistor 44. With switches 47 closed, the two-stage integrating network comprising resistors 50, 51 and capacitors 52, 53 is interposed between resistor 44 and the output terminals 48, 49 so that under transient conditions the changes in voltage between terminals 48, 49 lag the corresponding changes in voltage across resistor 44.

Thus, by selection of the active circuit parameters of network 16 and of the gain of the frequency meter network combination 38, 12, the magnitude and phase of the voltage appearing at terminals 48, 49 as a result of system frequency deviations may be predetermined.

The multiplier $G_A$ related to the total active generation of area A is provided by the slidewire 55 which is connected between the output terminals 48, 49 of network 16 and which is adjusted relative to its contact 56 either manually or by the wattmeter 57 which monitors the total generation of area A. Thus, the voltage appearing between terminals 48, 56 represents the component $F_1(t).K_1G_A\Delta f$ of the area-requirement signal.

The network 13 is a Wheatstone bridge including a slidewire 60 whose position relative to its contact 61 represents the existing frequency as monitored, for example, by the aforesaid frequency meter 38. The resistors 62, 62 of network 13 are so selected or adjusted that for normal frequency the bridge is in balance and its output voltage as appearing between contact 61 and terminal 63 is zero. When the frequency is other than normal, the output voltage of network 13 is of polarity and magnitude corresponding with the sense and extent of the frequency-deviation. The gain $K_g$, i.e., the relationship between the concurrent values of frequency deviation and the output of network 13 may be set or adjusted by the resistance 64 in series with the network supply source 65 or by the gearing or other linkage between the frequency meter and slidewire 60.

The time function $F_2(t)$ for this frequency deviation-component of the area-requirement signal is determined by the active parameters of network 17 which in composition is similar to networks 15 and 16. The resistors 65, 66 connected in series across the output terminals 61, 63 of network 13 form a voltage-divider. With the switch 67 open, the voltage drop across resistor 66 is a preselected fraction of the output voltage of bridge 13. With switch 67 closed, the capacitor 68 is connected in shunt to resistor 65 and in series with resistor 66 so to superimpose a differentiating action upon the potential-dividing action of resistors 65, 66.

With the switches 69 open, the voltage between output terminals 70, 71 of network 17 is essentially the same as that across resistor 66. With switches 69 closed, the two-stage integrating network comprising resistors 73, 74 and capacitors 75, 76 is included in circuit between the resistor 66 and the output terminals 70, 71 so that under transient conditions the changes in voltage between terminals 70, 71 lag the corresponding changes in voltage across resistor 66.

Thus, by selection of the active circuits parameters of network 17 and of the gain of the combination of frequency meter 38 and network 13, the magnitude and phase of the voltage appearing at the terminals 70, 71 may be predetermined.

The multiplier $G_{Ag}$ related to that part of the total generation of area A which is subject to the control action of speed governors and to the proportional gain of such speed governors is provided by the slidewire 77 which is connected between the output terminals 70, 71 of network 17 and which is adjusted relative to its contact 78 either manually or by wattmeter 79, in accordance with the speed-responsive generation of area A. Thus, the voltage between the terminals 70, 78 represents the component $K_gG_{Ag}F_2(t)\Delta f$ of the area-requirement signal.

The voltage across terminals 30, 31 representing $F(t)\Delta T_A$, the voltage across terminals 48, 56 representing $K_1G_AF_1(t)\Delta f$, and the voltage across terminals 70, 78 representing $K_gG_{Ag}F_2(t)\Delta f$ are in series in the major network 10 so that the sum of these voltages provides the area-requirement signal defined in Equation 3D. When the area A has no generation subject to speed-governor control, the switch 80 is thrown to its dotted-line position to exclude network 13 from the summation circuit so that the area-requirement signal does not include a component representing speed-responsive generation: alternatively, the slidewire 77 may be set to zero. Such area-requirement signal as appearing between terminal 31 and the movable contact of switch 80 in either position if switch 80 is retained may be fed directly into a computer for determining how the area-requirement may best be divided among the stations and units of the area or, as shown and now described, such signal may be reproduced in a computer 86 concurrently with rebalancing of network 10 by a recorder motor 81.

The area-requirement signal is balanced against the output of a rebalancing network 82 including a slidewire 83 which is adjustable relative to its contact 84 by the motor 81. The detector 84 in response to any unbalance between the area-requirement signal and the output of network 82 effects energization of motor 81 to effect a rebalancing adjustment of slidewire 83. Concurrently with this rebalancing adjustment, the motor 81 repositions the exhibiting element 85 of an area-requirement indicator or recorder and also reproduces, as by adjustment of an internal slidewire, the area-requirement signal within the computer 86 which may be of the type shown in any of the following U.S. Letters Patent: 2,836,730, 2,836,731 and 2,866,102.

In manner per se known, the computer 86 derives generation control signals for the various stations of the area A from the area-requirement signal alone or in combination with signals related to area-generation. Usually each station has more than one generating unit so that at station level, there is derived from the station demand signal the unit demand signals for control of the generation of individual units of that station. At station 1A, for example, the computer 87, which may be of type shown in any of the aforesaid patents, produces the unit demand voltages $e_1$ to $e_4$ respectively representing what the generation of each of units 1A1 to 1A4 should be, taking into account any base load setting and any existing area-requirement as fed to computer 87 over the telemetering channel 88.

The unit demand signals, because derived from the area-requirement signal produced as above described, each contain intelligence concerning the time displacement between changes in frequency and tie-line load and concerning the load/frequency characteristic of area A for its total generation and for its speed-responsive generation. As now explained, how these unit demand signals are utilized to control the inputs of individual units of station 1A and how the resulting changes in generation are utilized in the control depends upon whether or not a particular unit has a speed-responsive governor, and if so, upon the nature of the speed governor and the manner in which it is used.

For control of unit 1A1 which has no speed governor, the input or throttle valve 88 of prime mover 89 is positioned by the reversible rebalancing motor 90 of controller 91, which controller may be of the type shown in U.S. Letters Patent No. 2,666,171. This controller includes a rebalancing slidewire 97 adjusted concurrently by motor 90 with its repositioning of throttle valve 88. The controller 91 is responsive to unbalance between the unit demand signal $e_1$ and to the effective output of the rebalancing network 92 whose slidewire 93 is adjustable relative to its contact 94 by the wattmeter 95, or equivalent device, monitoring the output of generator 96 of unit 1A1. The controller 91 preferably includes provision for reset as well as proportional action to achieve complete rebalance with signal $e_1$. The generation of unit 1A1 is included in the total generation of the area as metered by wattmeter 57 of network 10 but is not included in the input to wattmeter 79.

The generating unit 1A2 of station 1A has a speed-governor having a flyball or equivalent element 94 which is driven in synchronism with the generator 100 of unit 1A2 and whose control arm 101 is coupled directly or through servo-motor to the throttle valve 98 or equivalent of the prime mover 99 of the unit. The setting of the biasing spring 102 of the governor is adjustable by the reversible motor 103 in the output system of controller 104. This controller is responsive to unbalance between the unit demand signal $e_2$ and the effective output voltage of the rebalancing network 105 whose slidewire 106 is adjustable relative to its contact 107 by the motor 103. Controller 104 preferably includes provision for rate action in addition to proportional control action. Thus, for unit 1A2, the generation control called for by the unit demand signal is superimposed upon the control action of the speed-responsive governor 96. By suitable summation circuits per se known, the generation of this unit as measured by wattmeter 108 is included in the total area-generation as totalized by wattmeter 57 and in the speed-responsive generation of the area as metered by wattmeter 79 or equivalent. The input to controller 104 is reduced to zero when a change in unit demand is balanced by a change in the bias setting of governor 96.

The unit 1A3 has a speed governor 110 whose flyball element 111, or equivalent centrifugal device, is driven in synchronism with the generator 112. The control arm 148 of the governor is coupled to the throttle valve 113 of the prime mover 114 of the unit. First, assuming that the speed governor 110 is to act only under emergency condition, the biasing spring 115 is set so that for all usual speeds the arm 148 is held by the flyball element 111 against the stop 116. With its speed governor so blocked, the generation of unit 1A3 is controlled in manner essentially the same as unit 1A1, and its generation is included in the total area-generation as monitored by wattmeter 57, but not in the speed-responsive generation of the area as monitored by wattmeter 79. Under any emergency conditions for which the speed of unit 1A3 tends to be dangerously high, the speed governor 110 becomes effective to reduce the input to prime mover 114.

Reverting to the blocked governor control exercised except under emergency conditions, the controller 117 is responsive to unbalance between the unit demand signal $e_3$ and the effective output voltage of the rebalancing network 118. The reversible motor 122 in the output system of controller 117 concurrently adjusts the internal rebalancing slidewire 109 of the controller and the governor stop 116. The controller 117 preferably includes provision for proportional, rate and reset control action. The slidewire 119 of the input balancing network 118 is adjustable relative to its contact 120 by the wattmeter 121 which monitors the output of generator 112. The input to controller 117 is returned to zero when a change in the unit demand is balanced by the required change in generation of unit 1A3.

By cutting controller 117 out of action and manually setting the stop 116, the unit 1A3 may be operated on fixed base load determined by the setting of the stop. In such case, the generation of unit 1A3 is included in the total area-generation as monitored by wattmeter 57 but not in the speed-responsive generation of area A as monitored by wattmeter 79. The unit 1A3 may be operated without superimposing a unit demand signal upon it by omitting controller 117 and raising stop 116 to a normally inoperative position. The unit generation will then vary with frequency in accordance with the governor characteristic as set, manually or by motor 123, by adjustment of the governor bias spring 115. For this mode of operation of unit 1A3, its generation is included both in total area generation, as monitored by wattmeter 57, and the speed-responsive generation as monitored by wattmeter 79.

The generation of unit 1A4 (FIG. 2) of station 1A is controlled in manner specifically different from units 1A1 to 1A3. Briefly, when there is a change in unit demand, the throttle setting is rapidly changed in response to unbalance in signals respectively representing the actual generation, unit demand, actual steam pressure, and normal steam pressure so to utilize the stored energy of the boiler of that unit to check load swings; also on slower basis, and predominantly only for sustained change in the unit demand, the input to the boiler is changed in response to unbalance involving required unit generation, actual unit generation, actual steam pressure, and normal steam pressure. With the signals suitably phased and weighted as later described, the pressure and generation changes effected by the throttle control minimize or avoid change in boiler input for transient tie-line power changes: appreciable change in boiler input occurs only for a sustained change in unit demand.

Specifically, the unit demand signal $e_4$ as appearing or reproduced at terminals 124, 125 is in series with the outputs of networks 126, 127 in the input circuit of controller 128. The slidewire 129 of network 126 is manually set relative to its contact 130 in accordance with the normal desired throttle steam pressure of the prime mover served by boiler 131. The slidewire 132 of network 127 is adjusted relative to its contact 133 by the Bourdon tube 134 or equivalent device responsive to actual steam pressure. When the inputs to controller 128 are not in balance, the motor 163 in the output system of the controller correspondingly rapidly changes the setting of the throttle valve 164 and concurrently effects a rebalancing adjustment of the internal controller slidewire 165.

The unit demand signal $e_4$ as appearing or reproduced at terminals 136, 137 is in opposition to the output of network 138 whose output voltage represents the actual output of generator 139 of unit 1A4. Specifically, the wattmeter 141 effects adjustment of slidewire 142 relative to its contact 143 to a position corresponding with the actual generation of unit 1A4. The difference between these two signal voltages respectively representing the generation required for the unit and the actual generation of the unit is applied to a time function network 150 which in composition may be similar to networks 15, 16, 17 above described. The resulting phase-displaced output of network 150 is impressed upon the input circuit of controller 144 together with the output of a second time function network 145 which provides a phase-displaced signal representing difference between actual steam pressure and normal steam pressure.

The motor 146 in the output system of controller 144 concurrently with its adjustment of the internal rebalancing slidewire 147 effects a corresponding change in the input of boiler 131 as by repositioning the fuel and feed water valves 151, 152.

With the phase and magnitude of the outputs of the time function networks 145, 150 suitably adjusted, the signals representing pressure deviation and generation deviation assume substantially equal and opposite values when the throttle valve 164 is moved by controller 128 in response to transient changes in unit demand. Thus, the input to the boiler of unit 1A4 is substantially unchanged in response to transient demand changes, though the generation of unit 1A4 is briefly changed in proper sense to damp or suppress the transient to an extend dependent upon boiler heat-storage capacity. If a sustained unit demand change is applied, the controller 144 is effective as above described to change the boiler input and steam pressure deviation is restrained through the action of controller 128. It will be understood that control execution as described provides for adjustment of relative responses of controllers 128 and 144, whereby apportioning of transient and sustained demand changes can be varied as described.

In the particular arrangement shown in FIG. 2, the unit demand signal e4 as produced by computer 87 of FIG. 1 is reproduced for inclusion in the input circuits of the controllers 128, 144 (FIG. 2) by the slidewires 155, 156 which are adjustable by motor 157. Upon change in the unit demand signal output of computer 87, the detector 158 effects energization of motor 157 to effect a rebalancing adjustment of slidewire 159 of the balancing network 160. Concurrently with such rebalancing of the input to detector 158, the motor 157 repositions the slidewires 155, 156 of potentiometer networks 161, 162 to change the output generation of unit 1A4 as above described.

It shall be understood that any of the time-function networks of FIGS. 1 and 2 may include additional differentiating or integrating stages to introduce more complex time-functions when required: it shall also be understood that the time-functions may also be produced by use of operational amplifiers or other known techniques of the art.

What is claimed is:

1. An arrangement for controlling in a power-distribution system the generation of an area having generation-changing means and having tie-line connection to at least one other generating area, said arrangement comprising frequency-responsive means coupled to said system for producing a first control signal, tie-line power-responsive means coupled to said system for producing a second control signal, means connected to apply said signals as components of an area-requirement signal for response thereto by said generation-changing means to change the area generation, and presettable means connected to modify at least said second signal to establish magnitude and phase relations of said signals which predetermine the extent to which the area generation is changed during existence of a tie-line power change.

2. An arrangement for controlling in a power-distribution system the generation of an area having generation-changing means and having tie-line connection to at least one other generating area, said arrangement comprising frequency-responsive means coupled to said system for producing a first control signal and whose gain may be varied, tie-line power-responsive means coupled to said system for producing a second control signal and whose gain may be varied, means connected to applying said signals as components of an area-requirement signal for response thereto by said generation-changing means to change the area generation, and means for presetting the extent to which the area generation is changed during existence of a tie-line power change comprising means for adjusting the gains of said two responsive means and for adjusting a time-delay effect upon said second signal.

3. An arrangement for controlling in a power-distribution system the generation of an area with tie-line connection to at least one other generating area, said first-named area having part of its total generation subject to regulation by speed-governor means, said arrangement comprising means coupled to said system for producing a first control signal related to frequency and modified at least in accordance with the response characteristics of active area generation subject to speed-governor regulation, means coupled to said system for producing a second control signal related to tie-line power, means connected to apply said signals as components of an area-requirement signal for response thereto by said speed-governor means to change the area generation, and means connected to vary the magnitude and phase relations of said signals to predetermine the extent to which the area-generation is changed by said speed-governor means during existence of a tie-line power change.

4. An arrangement for controlling in a power-distribution system the generation of an area with tie-line connection to at least one other generating area, said first-named area having part of its total generation subject to regulation by speed-governor means, said arrangement comprising means coupled to said system for producing a first control signal related to frequency and modified in accordance with the total active area generation and the response characteristics of active area-generation subject to speed-governor regulation, means coupled to said system for producing a second control signal related to tie-line power, means connected to apply said signals as components of an area-requirement signal for response thereto by said speed-governor means to change the area-generation, and means connected to vary the magnitude and phase relations of said signals to predetermine the extent to which the area generation is changed by said speed-governor means during existence of a tie-line power change.

5. An arrangement for controlling in a power-distribution system the generation of an area with a tie-line connection to at least one other generating area, said first-named area having part of its total generation supplied by a steam turbo-generator unit whose steam supply is controlled by regulating means to maintain a set supply pressure, said arrangement comprising frequency-responsive means coupled to said system for producing a first control signal, tie-line power-responsive means coupled to said system for producing a second control signal, and means connected to apply said signals in preset magnitude and phase relations as components of an area-requirement signal to change the area-generation including means for applying a selected portion of said area-requirement signal as a bias on the pressure setting of said regulating means to change the generation of said turbo-generator unit.

6. An arrangement as in claim 5 additionally including means for controlling inputs to a stem generator for said turbo-generator unit by signals respectively corresponding with the deviation of steam pressure from the set point and deviation of unit generation from the required sustained generation, said last-named means including means for adjusting the magnitude and phase relations of said steam-pressure deviation signal and said unit-generation deviation signal to maintain said inputs substantially constant during transient response of the generation of said turbo-generator unit to said selected portion of the area-requirement signal.

7. An arrangement for controlling in a power-distribution system the generation of an area having generation-changing means and having a tie-line connection to at least one other generating area, said first-named area having at least one generating unit with speed-responsive means and means coupling it to an input valve of the unit, said arrangement comprising frequency-responsive means coupled to said system for producing a first control signal, tie-line power-responsive means coupled to said system for producing a second control signal, and means connected to apply said signals in preset magnitude and phase relations as components of an area-requirement signal to change the area-generation, said last-named means including means responsive to a preselected portion of said area-requirement signal and effective through said coupling means to change the position of said input valve independently of said speed-responsive means.

8. An arrangement for controlling the electrical generation of an area having generation-changing means and having tie-line connection to at least one other generating area of a power-distribution system, said arrangement comprising responsive means coupled to said system for producing a first control signal representative of frequency, responsive means coupled to said system for producing a second control signal representative of deviations of tie-line power from a scheduled magnitude thereof, means connected to modify the effective magnitude of said first control signal as a function of the total active generation of the area, means connected to apply said signals as components of an area-requirement signal for response thereto by said generation-changing means to change the generation of the area to keep it on schedule, and presettable means connected to predetermine the phase and amplitude relations of said second signal with respect to concurrent changes of said modified first signal so to predetermine the extent to which the total active generation of the area is changed during existence of tie-line power changes.

9. An arrangement for controlling the electrical generation of an area having generation-changing means and having tie-line connection to at least one other generating area of a power-distribution system, said arrangement comprising responsive means coupled to said system for producing a first control signal representative of frequency, means connected to modify the effective magnitude of said first control signal as a function of the total active generation of the area, responsive means coupled to said system for producing a second control signal representative of deviations of tie-line power from a schedule, means coupled to said system for producing a third control signal representative of frequency, means connected to modify the magnitude of said third control signal as a function of the speed-responsive generation of the area, and means for applying said modified first and third signals and said second signal as components of an area-requirement signal for response thereto by said generation-changing means to change the generation of the area to keep it on schedule.

10. An arrangement as in claim 9 additionally including means presettable to predetermine the magnitude and phase relations between said components of the area-requirement signal to predetermine the extent to which the generation of the area is changed thereby.

References Cited by the Examiner
UNITED STATES PATENTS 2,839,962  6/58  Kirchmayer _____ 290—4

LLOYD McCOLLUM, *Primary Examiner.*

ORIS L. RADER, *Examiner.*

UNITED STATES PATENT OFFICE
CERTIFICATE OF CORRECTION

Patent No. 3,191,051                                        June 22, 1965

Edward S. Bristol

It is hereby certified that error appears in the above numbered patent requiring correction and that the said Letters Patent should read as corrected below.

Column 6, line 8, for "circuits" read -- circuit --; column 9, line 15, for "extend" read -- extent --; line 24, for "described" read -- desired --; line 68, for "applying" read -- apply --; column 12, line 28, for "2,839,962" read -- 2,839,692 --.

Signed and sealed this 10th day of May 1966.

(SEAL)
Attest:

ERNEST W. SWIDER                                    EDWARD J. BRENNER

Attesting Officer                                         Commissioner of Patents

UNITED STATES PATENT OFFICE
CERTIFICATE OF CORRECTION

Patent No. 3,191,051                            June 22, 1965

Edward S. Bristol

It is hereby certified that error appears in the above numbered patent requiring correction and that the said Letters Patent should read as corrected below.

Column 3, lines 4 to 6, the formula should appear as shown below instead of as in the patent:

$$F(t) = K_2 (1 - e^{\frac{-t}{T_c}})$$

same column 3, lines 17 to 19, the formula should appear as shown below instead of as in the patent:

$$F_1(t) = 1 + K_3 e^{\frac{-t}{T_{c1}}}$$

same column 3, lines 59 to 61, the formula should appear as shown below instead of as in the patent:

$$\left( 1 - e^{\frac{-t}{T_g}} \right)$$

Signed and sealed this 15th day of August 1967.

(SEAL)
Attest:

EDWARD M. FLETCHER, JR.                          EDWARD J. BRENNER
Attesting Officer                                 Commissioner of Patents